United States Patent [19]

Inoue

[11] Patent Number: 4,778,223
[45] Date of Patent: Oct. 18, 1988

[54] ANTI-SKID BRAKING SYSTEM FOR AUTOMOTIVE VEHICLE

[75] Inventor: Hideo Inoue, Kanagawa, Japan

[73] Assignee: Toyota Jidosha Kabushiki Kaisha, Aichi, Japan

[21] Appl. No.: 929,415

[22] Filed: Nov. 12, 1986

[30] Foreign Application Priority Data

Nov. 14, 1985 [JP] Japan .................. 60-255721

[51] Int. Cl.⁴ .......................... B60T 8/58; B60T 8/86; F16D 65/14
[52] U.S. Cl. ..................................... 303/100; 303/93; 303/9.74; 188/106 P
[58] Field of Search .................. 180/197; 188/181 A, 188/106 P; 303/3, 6 A, 6 R, 10, 19, 93, 94, 100, 103, 106, 109, 110, 111, 113, 119

[56] References Cited

U.S. PATENT DOCUMENTS

| 3,608,979 | 9/1971 | Coyle | 303/111 |
|---|---|---|---|
| 3,895,698 | 7/1975 | Fontaine | 303/19 |
| 3,971,595 | 7/1976 | Kondo | 303/10 |
| 4,327,414 | 4/1982 | Klein | 303/93 |
| 4,508,393 | 4/1985 | Drometer | 303/111 |
| 4,602,824 | 7/1986 | Nishimura et al. | 303/119 |
| 4,630,871 | 12/1986 | Imoto et al. | 303/113 |
| 4,658,939 | 4/1987 | Kircher et al. | 180/197 |

FOREIGN PATENT DOCUMENTS 57-051562  3/1982  Japan .
22786  4/1983  Japan .
58-188746  11/1983  Japan .

Primary Examiner—Andres Kashnikow
Assistant Examiner—Timothy Newholm
Attorney, Agent, or Firm—Parkhurst, Oliff & Berridge

[57] ABSTRACT

An anti-skid braking system for an automotive vehicle, including a first brake system and a second brake system. The first brake system has a master cylinder for generating a fluid pressure corresponding to an operation value of a brake operating member, a first brake for a wheel of the vehicle equipped with a brake cylinder actuated by the pressure of the master cylinder, and a first solenoid valve device between the master and brake cylinders and operable between a first and a second position for communication of the brake cylinder with the master cylinder and a reservoir, respectively. The braking system includes a second brake system which has a second brake cooperating with the first brake to apply a brake to the wheel; a speed sensor for detecting a speed of the wheel; and an anti-skid controller for estimating a slip ratio of the wheel based on the detected speed. The anti-skid controller controls the first solenoid valve device, if the estimated slip ratio of the wheel has exceeded a predetermined upper limit, to lower the pressure in the brake cylinder to a level at which the slip ratio is in a predetermined optimum range, the anti-skid controller subsequently controlling a brake force of the second brake, to maintain the slip ratio within the optimum range.

21 Claims, 3 Drawing Sheets

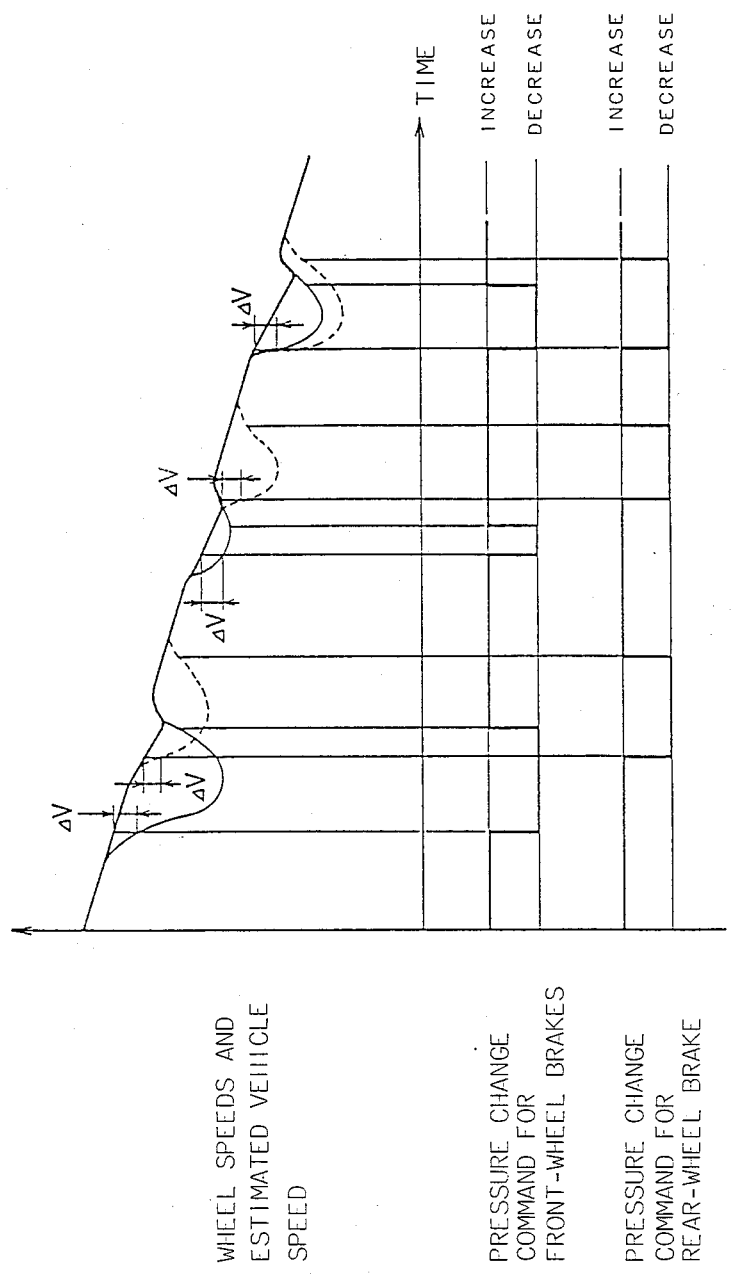

ANTI-SKID BRAKING SYSTEM FOR AUTOMOTIVE VEHICLE

BACKGROUND OF THE INVENTION

1. Field of the Invention

The present invention relates in general to a braking system for automotive vehicles such as four-wheel automobiles, two-wheel motor cycles or various vehicles or trucks for industrial purposes. More particularly, the invention is concerned with an anti-skid braking system capable of applying brakes to the wheels of the vehicle, while preventing skidding of the wheels on the road surface.

2. Discussion of the Prior Art

The friction force between a wheel of the vehicle and the road surface is maximum when the ratio of slip of the wheel on the road surface is in a certain range. In other words, it is desirable to control the brake force of each wheel so as to maintain its slip ratio within an optimum range, for stopping the vehicle with a minimum running distance after the brake application, without a loss of straight-line running stability of the vehicle. To this end, a variety of anti-skin braking systems are proposed. An example of such an anti-skin braking system is disclosed in Japanese Patent published for opposition purpose under Publication No. 51-6308. In this type of anti-skid braking system, the controller estimates a slip ratio of a wheel of the vehicle, based on an output signal of a speed sensor for detecting the rotating speed of the wheel. The fluid pressure in the brake cylinder for the wheel is controlled so that the slip of the wheel is held within a predetermined optimum range. While it has been stated above that "the controller estimates a slip ratio", the slip ratio is not actually estimated in the strict sense. Generally, the controller estimates the running speed of the vehicle (usually expressed by the rotating speed of the wheels), and merely obtains a difference between the estimated running speed of the vehicle, and the actual rotating speed of the wheels. In this respect, it is noted that the term "slip ratio" used herein is interpreted to also mean the "difference" indicated above.

It will be understood that the friction coefficient of the road surfaces on which the vehicle is expected to run is changed over a wide range, from an extremely low value as a frozen road surface, up to a very high value as a dry asphalt pavement. To cover such a wide range of friction coefficient of the road surfaces, it has been necessary to use a controller which is capable of controlling the braking pressure over a correspondingly wide range. Practically, however, a controller capable of achieving an optimum control of the braking pressure over such a wide range is difficult to design and manufacture. In the conventional anti-skid braking system, therefore, the braking pressure is controlled in a satisfactory manner in a relatively limited area of the range that should be covered. Namely, a satisfactory control of the braking pressure cannot be obtained in the area near the upper or lower limit of the pressure coverage. For example, a stable anti-skin control of the braking system may be attained while the slip ratio of the wheel is below the upper limit of an optimum range, but the stability of the anti-skid control is rapidly lowered when the slip ratio exceeds the upper limit. Hence, it is desired to rapidly reduce the fluid pressure in the brake cylinder when the slip ratio exceeds the upper limit of the optimum range. However, a rapid decrease in the fluid pressure makes it difficult to accurately control the amount of decrease of the fluid pressure. Further, since the rate of decrease of the fluid pressure in the comparatively high range is different from that in the comparatively low range, an optimum control of the pressure reducing rate is difficult to obtain over the entire range of the fluid pressure.

SUMMARY OF THE INVENTION

It is accordingly an object of the present invention to provide an anti-skid braking system for an automotive vehicle, equipped with a controller whose control range is relatively narrow, and which is capable of effecting an optimum anti-skid control of the brake force, over a relatively wide range of friction coefficients of the road surfaces on which the vehicle runs.

The above object may be achieved by the present invention which provides an anti-skid braking system for an automotive vehicle, comprising a first brake system, a second brake system, a speed sensor and an anti-skid controller. The first brake system includes (a) an operator-controlled brake operating member, (b) a master cylinder responsive to an operation of the brake operating member, for generating a fluid pressure which corresponds to an operation value of the brake operating member, (c) a first brake provided for a wheel of the vehicle, and having a brake cylinder which is actuated by the fluid pressure generated by the master cylinder, and (d) first solenoid-operated control valve means disposed in a fluid passage between the master cylinder and the brake cylinder, and operable between a first position for communication of the brake cylinder with the master cylinder, and a second position for communication of the brake cylinder with a reservoir. The second brake system includes a second brake which cooperates with the first brake to apply a brake to the wheel of the vehicle. The speed sensor is adapted to generate a speed signal indicative of a rotating speed of the wheel. The anti-skid controller is connected to the first and second brake systems and the speed sensor, and is operable for estimating a slip ratio of the wheel of the vehicle based on the speed signal generated by the speed sensor. The controller determines whether the estimated slip ratio exceeds a predetermined upper limit, and operates the first solenoid-operated control valve means, if the estimated slip ratio of the wheel has exceeded the upper limit, so as to lower the fluid pressure in the brake cylinder to a level lower than on point at which the slip ratio is in a predetermined optimum range. Subsequently, the anti-skid controller controls a brake force of the second brake, so as to maintain the slip ratio within the optimum range.

In the anti-skid braking system of the present invention constructed as described above, the anti-skid controller is adapted such that if the estimated slip ratio of the wheel has exceeded the predetermined upper limit, the fluid pressure in the brake cylinder of the first brake system is lowered down to a level at which there is no possibility of a slip of the wheel due to braking solely by the first brake. After the fluid pressure in the first brake has been lowered to that level, then the brake force produced by the second brake is controlled so that the slip ratio of the wheel is maintained within a predetermined upper limit. Thus, the brake force of the first brake and the brake force of the second brake are both applied to the singe wheel, and the brake force of the second brake is controlled for adjusting the total brake force of the first and second brakes so as to maintain the slip ratio within the optimum range.

The above-indicated upper limit of the slip ratio may be an upper limit of the predetermined optimum range within which the slip ratio is maintained by adjustment of the brake force of the second brake. Alternatively, the upper limit may be selected within the predetermined optimum range. In this latter case, the anti-skid control operation of the second brake is initiated even while the slip ratio of the wheel falls within the optimum range.

As is apparent from the above description, the anti-skid controller used in the present anti-skid braking system may serve the required function, even if its control range of the brake pressure is relatively narrow. Accordingly, the anti-skid controller is easy to design, yet excellent in its anti-skid control function, capable of controlling the first and second brake systems without skidding or locking of the wheel on road surfaces having varying friction coefficients.

Further, the present anti-skid braking system substantially eliminates the drawbacks experienced in the conventional anti-skid braking system wherein the fluid pressure in the brake cylinder connected to the master cylinder is changed for effecting anti-skid control. More specifically, the instant braking system does not suffer from the conventional problem of deteriorated braking feel due to shocks which may be imparted to the brake pedal because the pressure changes in the brake cylinder are transmitted to the master cylinder. Moreover, the instant braking system is substantially free of the conventionally encountered deterioration of the sealing members used in the master cylinder, due to severe fluctuation of the fluid pressure acting on the sealing members. Thus, the braking system of the invention assures improved life expectancy of the sealing members of the master cylinder.

According to one feature of the invention, the anti-skid controller is operable selectively in a first mode in which the first solenoid-operated control valve means is controlled while the brake force of the second brake is controlled, if the controller determines that the estimated slip ratio has exceeded the upper limit, or in a second mode in which only the control of the brake force of the second brake is effected, without the control of the first control valve means, if the controller determines that the estimated slip ratio has exceeded the upper limit.

According to another feature of the invention, the anti-skid controller is operable to place the first solenoid-operated control valve means in the second position for communication of the brake cylinder with the reservoir, if the controller determines that a decrease in the brake force of the second brake is not sufficient to maintain the slip ratio within the optimum range, even after the control of the brake force of the second brake is commenced so as to maintain the slip ratio within the optimum range.

According to a further feature of the invention, the first brake and the second brake are provided for each of a left-front and a right-front wheel, and a left-rear and a right-rear wheel of the vehicle.

In one form of the above feature of the invention, the second brake is hydraulically operated, and the second brake system includes a hydraulic pressure source operated by a power unit to generate a fluid pressure, a reservoir for storing a working fluid, and second solenoid-operated control valve means controlled by the anti-skid controller, between a first position for communication of a brake cylinder of the second brake with the hydraulic pressure source, and a second position for communication of the brake cylinder of the second brake with the rservoir. A single common reservoir may be employed to serve as the reservoir of the first brake system and the reservoir as the second brake system. Further, the hydraulically operated second brake may be replaced by an electromagnetic brake, a regenerative brake, or other types of brake which are capable of easily changing the brake pressure.

In the above form of the invention, the second solenoid-operated control valve means may include front-wheel solenoid-operated control valve means connected to a pair of second front-wheel brakes provided for the left-front and right-front wheels, and rear-wheel solenoid-operated control valve means connected to a pair of second rear-wheel brakes provided for the left-rear and right-rear wheels. In this case, the speed sensor is provided for each of the left-front and right-front, and left-rear and right-rear wheels. The anti-skid controller controls the front-wheel solenoid-operated control valve means based on one of two front-wheel speed signals of the speed sensors for the left-front and left-right wheels, which indicates a higher rotating speed than the other front-wheel speed signal. The anti-skid controller controls the rear-wheel solenoid-operated control valve means based on one of two rear-wheel speed signals of the speed sensors for the left-rear and right-rear wheels, which indicates a lower rotating speed than the other rear-wheel speed signal. The second solenoid-operated control valve means may be adapted to control rates of flow of the fluid into and from the brake cylinder of the second brake.

According to an advantageous feature of the invention, the anti-skid braking system further comprises a second-brake controller connected to the second brake system, for automatically activating the second brake, for a purpose other than maintaining the slip ratio within the optimum range. In this arrangement, the second-brake controller controls the brake force of the second brake, even while the slip ratio of the wheel is held within the predetermined optimum range. The second-brake controller gives the braking system increased functional versatility, at a relatively small additional cost.

In one form of the above advantageous feature of the invention, the second-brake controller is operable while the anti-skid controller is not operating, and becomes inoperable when the anti-skid controller starts to operate.

In another form of the above feature, the braking system further comprises a first detecting device for detecting the operation value of the brake operating member, and a second detecting device for detecting an actual braking effect applied to the vehicle. The first and second detecting devices are connected to the second-brake controller. The first brake is designed so that its braking effect is smaller than a desired braking effect predetermined corresponding to the operation value of the brake operating member detected by the first detecting device. The second-brake controller compares the actual braking effect detected by the second detecting device with the desired braking effect, and operates the second brake so that the second brake produces a braking effect equal to a difference between the actual and desired braking effects. In this arrangement, the instability of the braking effect due to fluctuation of the friction coefficient of the brake pads may be suitably compensated for by adjusting the brake force produced by the second brake. Generally, the friction coefficient of the brake pads tends to be varied over a wide range, particularly depending upon the operating conditions. Accordingly, it is difficult to obtain a constant braking effect even with a constant force or amount of operation of the brake operating member. The instant arrangement overcomes this inconvenience, by designing the first brake so that the braking effect produced thereby is smaller than the predetermined desired or target braking effect corresponding to each specific operation value of the brake operating member, and by activating the second brake so as to produce a braking effect corresponding to a difference between the actual and desired braking effects of the braking system. The instant arrangement therefore permits the first and second brakes to provide an ideal total braking effect under any conditions, irrespective of the friction coefficient of the brake pads.

In the above form of the invention, the second-brake controller may include a computer which comprises a control pattern memory storing control pattern data representative of a relation between the operation value of the brake operating member and the desired braking effect. Preferably, the control pattern memory stores a plurality of braking-effect control patterns representative of different relations between the operation value and the desired braking effect. In this case, the computer automatically selects predetermined one of the plurality of braking-effect control patterns, as an initially set pattern, upon application of power to the second-brake controller. The braking system further comprises an operator-controlled pattern selector means connected to the second-brake controller, and the computer replaces the automatically selected one of the braking-effect control patterns by another selected by the pattern selector means.

The first detecting device may be adapted to detect an operating force exerted to the brake operating member, and the second detecting device may be adapted to detect a rate of deceleration of the vehicle. In this arrangment, the control pattern memory may store control pattern data representative of a relation between the operation force and the rate of deceleration. In this case, the operator-controlled brake operating member may consist of a foot-operated brake pedal, and the first detecting device may be a pressure sensor disposed on a pedal pad of the brake pedal. Further, the second detecting device may be a deceleration sensor operable for detecting the rate of deceleration of the vehicle.

In accordance with another form of the above advantageous feature of the invention wherein the second-brake controller is provided, the first brake and the second brake are provided for each of a left-front and a right-front wheel, and a left-rear and a right-rear wheel of the vehicle. In this instance, the second-brake controller includes a control pattern memory storing at least one distribution control pattern representative of a desired relation between a sum of brake forces of the first and second brakes for the left-front and right-front wheels, and a sum of brake forces of the first and second brakes for the left-rear and right-rear wheels. The second brake for the left-front and right-front wheels is controlled according to the desired relation.

In one arrangement of the above form of the invention, the braking system further comprises a front-wheel load sensor for sensing a load applied to the left-front and right-front wheels, a rear-wheel load sensor for sensing a load applied to the left-rear and right-rear wheels, a front-wheel brake-force sensor for sensing the front-wheel brake forces, and a rear-wheel brake-force sensor for sensing the rear-wheel brake force. In this arrangement, the changes in the braking effect due to changes in the load conditions of the four wheels can be suitably compensated for by operating the second brake.

According to a further form of the above-indicated advantageous feature of the invention, the second-brake controller includes a control pattern memory which stores a timing control pattern indicative of a relation between a time lapse from the commencement of brake application to the vehicle, and a desired braking effect. In this case, the second brake is controlled according to the relation between the time lapse and the desired braking effect.

The first brake system may further include an emergency control circuit operable for normally placing the first solenoid-operated control valve means in the first position for communication of the first brake with the master cylinder, and for placing the first solenoid-operated control valve means in the second position for communication of the first brake with the reservoir, if an actual braking effect produced by the first brake exceeds the desired braking effect.

According to a still further form of the advantageous feature of the invention wherein the second-brake controller is provided, a traction controller is provided for activating the second brake so as to maintain a slip ratio of a drive wheel of the vehicle within another predetermined optimum range, if the slip ratio has exceeded another predetermined upper limit, when the vehicle is started.

Further, the second-brake controller may include a controller operable for activating the second brake while the vehicle is temporarily stopped on a slope, or with its automatic transmission placed in its drive position. This arrangement prevents otherwise possible rolling of the vehicle on the slope, or unexpected start of the vehicle.

BRIEF DESCRIPTION OF THE DRAWINGS

The foregoing and optional objects, features and advantages of the present invention will be better understood by reading the following detailed description of a preferred embodiment of the invention, when considered in connection with the accompanying drawings, in which:

FIG. 6 is a diagrammatic view explaining an anti-skid control operation of the braking system shown in FIG. 1.

DETAILED DESCRIPTION OF THE PREFERRED EMBODIMENT

Figure 1:
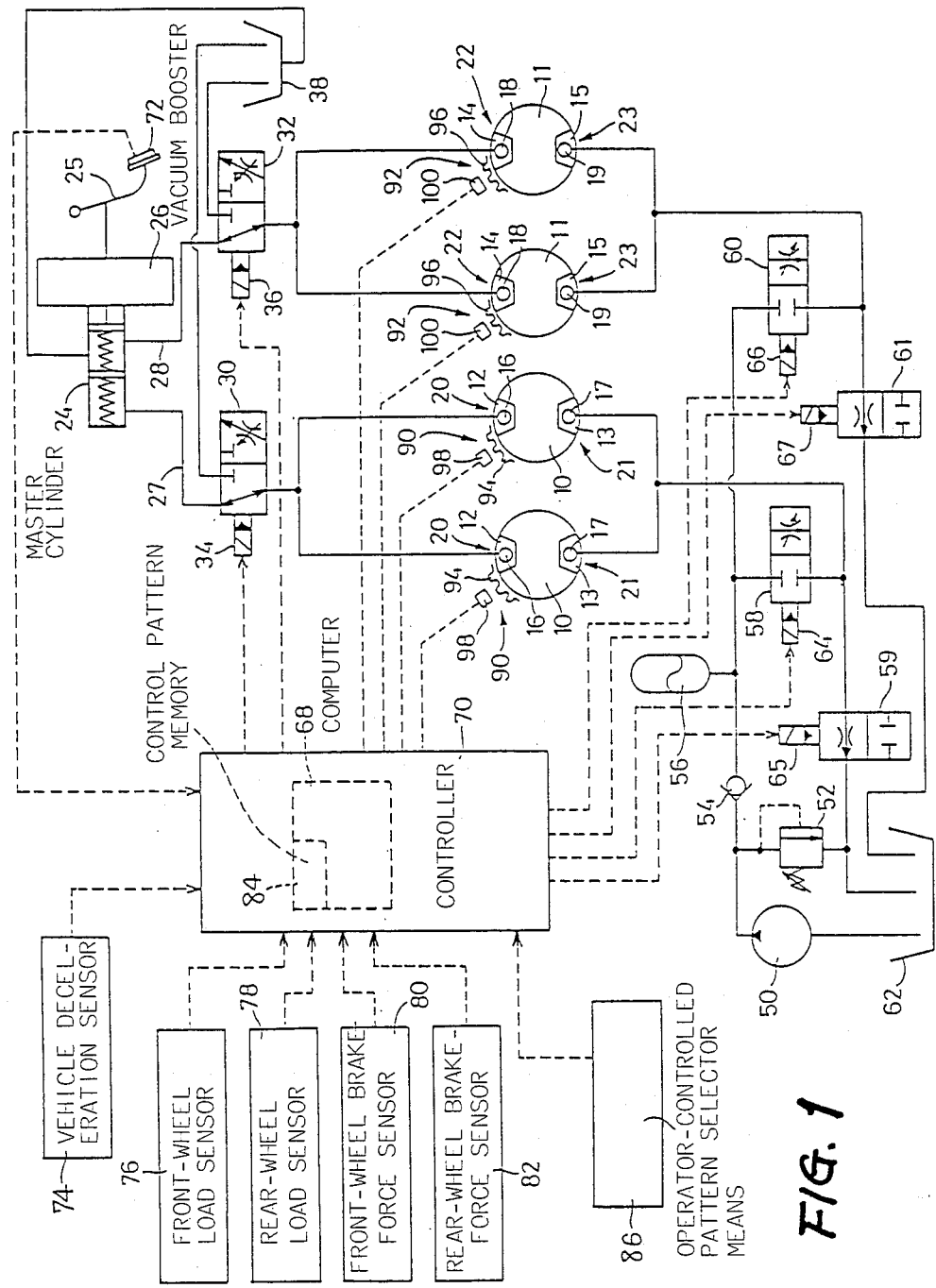
FIG. 1 is a schematic diagram showing one embodiment of anti-skid braking system of the present invention for an automotive vehicle.

Referring first to FIG. 1, two pairs of circles indicated by reference numerals 10, 11 represent corresponding two pairs of disc rotors. The two disc rotors 10 are respectively attached to a left-front and a right-front wheel of a four-wheel automotive vehicle, while the two disc rotors 11 are respectively attached to a left-rear and a right-rear wheel of the vehicle. Each of the front disc rotors 10 is equipped with a pair of calipers 12, 13. Similarly, each of the rear disc rotors 11 is equipped with a pair of calipers 14, 15. Each of the calipers 12, 13, 14, 15 has a brake cylinder 16, 17, 18 or 19. With a hydraulic pressure applied to each of these brake cylinders, a pair of brake pads are forced against the opposite friction surfaces of the corresponding disc rotor 10, 11, whereby the rotating motions of the disc rotors and consequently the corresponding wheels are restrained. Thus, a brake is applied to the vehicle. Brakes having the brake cylinder 16 are referred to as first front-wheel brakes 20, while brakes having the brake cylinder 17 are referred to as second front-wheel brakes 21. Similarly, brakes having the brake cylinder 18 are referred to as first rear-wheel brakes 22, while brakes having the brake cylinder 19 are referred to as second rear-wheel brakes 23.

The brake cylinders 16, 18 of the first front-wheel and rear-wheel brakes 20, 22 are supplied with a pressurized fluid generated by a master cylinder 24. An operator-controlled brake operating member in the form of a brake pedal 25 is connected via a vacuum booster 26 to the master cylinder 24. An operating force or depression force exerted to the brake pedal 25 by the vehicle operator is boosted by the vacuum booster 26, and the boosted force is imparted to the master cylinder 24. As a result, the same level of fluid pressure is generated in two mutually independent pressure chambers of the master cylinder 24. The fluids pressurized in the two pressure chambers are delivered to the brake cylinders 16 of the first front-wheel brakes 20, and to the brake cylinders 18 of the first rear-wheel brakes 22, through corresponding conduits 27, 28, and through corresponding solenoid-operated control valves 30, 32, respectively. Normally, the solenoid-operated control valves 30, 32 are placed in their first position shown in FIG. 1, in which the master cylinder 24 is held in communication with the brake cylinders 16, 18. With controlled amounts of an electric current applied to solenoids 34, 36, the control valves 30, 32 are placed in their second position for communication of the brake cylinders 16, 18 with a reservoir 38. Namely, the control valves 30, 32 in the second position allow the pressurized brake fluid in the brake cylinders 16, 18 to be discharged into the reservoir 38, at flow rates determined by the amount of electric currents applied to the respective solenoids 34, 36. The brake cylinders 16, 18 of the first front-wheel and rear-wheel brakes 20, 22 are designed so as to produce a braking effect which is smaller than an optimum or desired braking effect that is predetermined corresponding to the specific operation or depression force exerted on the brake 25. The first front-wheel and rear-wheel brakes 20, 22, master cylinder 24, brake pedal 25, conduits 27, 28, solenoid-operated control valves 30, 32, reservoir 38, cooperate to constitute a major part of a first brake system of the instant anti-skid braking system.

On the other hand, the brake cylinders 17, 19 of the second front-wheel and rear-wheel brakes 21, 23 are supplied with a pressurized fluid delivered from a hydraulic pressure source, which includes a hydraulic pump 50, a relief valve 52, a check valve 54 and an accumulator 56. The flows of the fluids to and from the brake cylinders 17, 19 are controlled by a pair of solenoid-operated control valves 58, 59, and a pair of solenoid-operated control valves 60, 61, respectively. These control valves 58, 59, 60 and 61 are normally placed in their first position of FIG. 1, in which the brake cylinders 17, 19 are disconnected from the hydraulic pressure source, and are held in communication with a reservoir 62. With controlled amounts of an electric current applied to respective solenoids 64, 65, 66, 67, the control valves 58–61 are placed in their second position in which the brake cylinders 17, 19 are disconnected from the reservoir 62, and are held in communication with the pressure source, so that the fluid pressures in the brake cylinders 17, 19 are raised. The rate of rise in the fluid pressure may be changed by adjusting the amounts of electric current to the solenoids 64, 66. The second front-wheel and rear-wheel brakes 21, 23 having the brake cylinders 17, 19, hydraulic pump 50, accumulator 56 and solenoid-operated control valves 58–61, cooperate to constitute a major part of a second brake system of the anti-skid braking system.

The supply of an electric current to the solenoids 34, 36, 64, 65, 66 and 67 is controlled by a controller 70 which is mainly constituted by a computer 68. To the controller 70 is connected a pressure sensor 72 disposed on a pedal pad of the brake pedal 25. This pressure sensor 72 serves as a detecting device for detecting an operation force exerted to the brake operating member in the form of the brake pedal 25. There is also connected to the controller 70 a vehicle deceleration sensor 74 which is adapted to generate an electric signal indicative of a rate of deceleration (or acceleration) of the vehicle. The deceleration sensor 74 serves as a detecting device for detecting an actual braking effect applied by the braking system to the vehicle.

Also connected to the controller 70 are: a front-wheel load sensor 76 which detects a load applied to the front wheels; a rear-wheel load sensor 78 which detects a load applied to the rear wheels; a front-wheel brake-force sensor 80 which detects a brake front produced by the front wheels; and a rear-wheel brake-force sensor 82 which detects a brake force produced by the rear wheels. For instance, the front-wheel and rear-wheel load sensors 76, 78 may consist of sensors of a type which detects a relative displacement between the corresponding axle and the body of the vehicle, that occurs due to a change in the amount of elastic deformation of suspension springs, depending upon varying loads applied to the pairs of front and rear wheels. As the front-wheel and rear-wheel brake-force sensors 80, 82, it is possible to use strain gauges arranged to detect forces exerted to the brackets that support that calipers 12, 13, and 14, 15, upon brake application.

Figure 2:
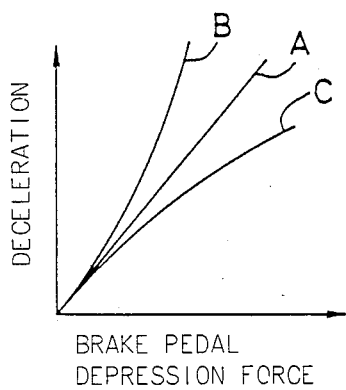
FIGS. 2, 3 and 4 are graphs which show control patterns stored in a control pattern memory of the braking system of FIG. 1.
Figure 3:
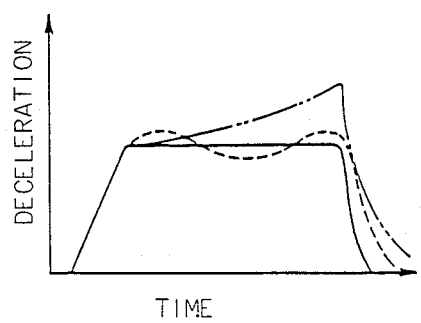
Figure 4:
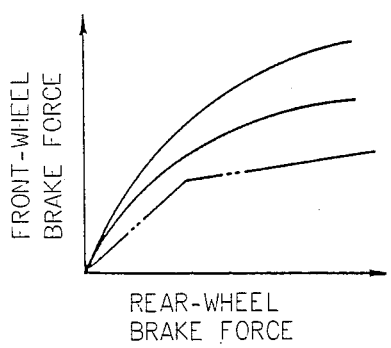

The computer 68 of the controller 70 incorporates a control pattern memory 84 which is adapted to store various control pattern data as indicated in solid lines in FIGS. 2 through 4. Lines A, B and C shown in FIG. 2 indicate braking-effect control patterns representative of different relations between the operation force exerted to the brake pedal 25, and the desired rate of deceleration of the vehicle, i.e., desired braking effect to be applied to the vehicle. Line A indicates a most commonly used braking effect pattern in which the deceleration rate or braking effect increases in proportion to the operating force applied to the brake pedal 25. Line B shows a braking effect pattern wherein the rate of increase in the deceleration rate increases as the operating force acting on the brake pedal 25 increases. This pattern gives the vehicle driver a "sporty" braking feel. Line C represents a pattern in which the rate of increase in the deceleration rate decreases with an increase in the operating force on the brake pedal 25. This pattern produces a "smooth" braking effect, permitting a better vehicle deceleration comfort. The vehicle driver may select any desired one of the three patterns A, B and C, with operator-controlled pattern selector means in the form of a selector 86 which is connected to the controller 70.

The graph of FIG. 3 shows a timing control pattern indicative of a relation after a time lapse after the commencement of brake application to the vehicle, and the desired deceleration rate of the vehicle (desired braking effect). Generally, the deceleration rate of the vehicle upon each brake application is varied as a function of time as indicated in two-dot chain line or dashed line in FIG. 3, due to a change of the friction coefficient of the brake pads or other changing parameters, even if the operation force action on the brake pedal 25 is kept constant. However, the control pattern memory 84 stores the relation as indicated in solid line in the figure. As a matter of course, it is possible to use other deceleration-time relations wherein the deceleration rate varies as a function of time, to produce a desired braking effect.

The control pattern memory 84 further stores a plurality of brake force distribution control patterns, as shown in solid lines in FIG. 4 by way of examples. Each control pattern represents a desired relation between a sum of brake forces applied to the front wheels and a sum of brake forces applied to the rear wheels. The control patterns are provided corresponding to different load conditions of the vehicle. Controlling the ratio of brake forces of the front wheels to the rear wheels according to the selected one of the control patterns, will avoid a decrease in the straight-line running stability of the vehicle, due to skidding of the front wheels prior to that of the rear wheels, or vice versa. Conventionally, a proportioning valve is used with or without a load sensor, for example, to control the fluid pressures in the rear-wheel brakes, in order to provide a front-rear brake force distribution as indicated in two-dot chain line in FIG. 4. However, a brake force produced by a brake is determined by a friction coefficient of the friction pads, as well as a pressure level of the fluid in the brake. It is inevitable that the friction coefficient of the friction pads is varied over a considerably wide range. Accordingly, it has been difficult to provide an ideal distribution of brake forces between the front and rear brakes. Further, the use of a proportioning valve with a load sensor suffers from extreme difficulty in adjusting the load sensor during installation on the vehicle. According to the present braking system of the invention, the controller 70 is adapted to detect a load condition of the vehicle based on the signals generated by the load sensors 76, 78, and select one of the distribution patterns which suits the detected load condition of the vehicle. The fluid pressures in the brake cylinders 17, 19 of the second front-wheel and rear-wheel brakes 21, 23 are controlled according to the selected distribution pattern, so that the brake forces applied to the front wheels are changed in a suitable proportion to the brake forces applied to the rear wheels.

As understood from the foregoing description, the controller 70 having the control pattern memory 84 serves as a second-brake controller for controlling the solenoid-operated control valves 58, 59, 60 and 61 of the second brake system including the second brakes 21 and 23.

The vehicle is provided with two front-wheel speed sensors 90 for the front wheels, and two rear-wheel speed sensors 92 for the rear wheels. These speed sensors 90, 92 detect the rotating speeds of the corresponding wheels. Each of the speed sensors 90, 92 has a gear 94 or 96 rotatable with the corresponding wheel, and a detecting head 98 or 100 disposed adjacent to the gear 94, 96 for detecting the passage of teeth of the gear during rotation of the wheel. Front-wheel speed signals and rear-wheel speed signals produced by the speed sensors 90, 92 are fed to the controller 70.

For effecting an anti-skid control operation of the braking system as illustrated in FIG. 6, the computer 68 uses one of the two front-wheel signals of the speed sensors 90, which represents higher one of the rotating speeds of the two front wheels, and one of the two rear-wheel speed signals of the speed sensors 92, which represents lower one of the rotating speeds of the two rear wheels. In FIG. 6, thin solid line represents the higher rotating speed of one of the front wheels, and dashed line represents the lower rotatng speed of one of the rear wheels. These two speeds are considered so the speeds of the front and rear wheels, respectively. Thick solid line represents a running speed of the vehicle (expressed by rotating speed of the wheels) which is estimated by the computer 68, on the assumption that "one of the rotating speeds of the front and rear wheels which is higher than the other represents the running speed of the vehicle, and the deceleration rate of the vehicle cannot exceed 1.15 G". The computer 68 calculates a deviation of the speed of each wheel from the estimated vehicle running speed, in order to initiate an anti-skid control of the braking system by means of the solenoid-operated control valves 30, 32, 58, 59, 60 and 61, if the calculated deviation or difference exceeds a predetermined limit. Thus, the controller 70 whose major part is constituted by the computer 68 serves as an anti-skid controller for controlling the control valves 30, 32, 58–61 to effect the anti-skid control operation which will be described in greater detail.

The operation of the present braking system will be described below.

When a key switch of the vehicle is turned on, power is applied to the controller 70, and the computer 68 is automatically initialized. More specifically, various counters, flags, memorys, etc. are set, reset or cleared to their initial positions. For example, the braking effect pattern (deceleration-brake pedal depression curve) A of FIG. 4 is selected as an initially set pattern. If needed, the vehicle driver may replace the initially set pattern A by another control pattern B or C, by operating the selector 86 after the initialization of the computer 68 is terminated. By way of illustration, the operation of the braking system will be described, assuming that the braking-effect control pattern B has been selected by the vehicle driver.

While the output signal of the vehicle deceleration sensor 74 is indicating substantially no deceleration or acceleration of the vehicle, the computer 68 determines the load condition of the vehicle based on the output signals received from the front-wheel and rear-wheel load sensors 76, 78. Based on the determined load condition, the computer 68 selects the appropriate one of the brake-force distribution control patterns as shown in FIG. 4. The above steps are repeated while the vehicle is running at a constant speed. When a rate of deceleration or acceleration of the vehicle exceeding a predetermined limit is detected, the above steps of operation are interrupted.

If the brake pedal 25 is depressed while the vehicle is running, the fluid pressure corresponding to the depression force on the pedal 25 is generated in the master cylinder 24. Since the solenoid-operated control valves 30, 32 are normally placed in the first position for communication of the master cylinder 24 with the brake cylinders 16, 18, the pressure of the master cylinder 24 is applied to the brake cylinders 16, 18, whereby the first front-wheel brakes 20, and the first rear-wheel brakes 22 are activated. In the meantime, the computer receives a signal from the pressure sensor 72 indicative of the operating force acting on the brake pedal 25. Based on the signal from the pressure sensor 72, and the braking-effect control pattern B of FIG. 2, the computer 68 obtains a desired rate of deceleration of the vehicle, i.e., a desired braking effect. Then, the computer 68 calculates an actual rate of deceleration of the vehicle based on the output signal of the vehicle deceleration sensor 74. The computer 68 calculates a difference between the desired and actual rates of deceleration, that is, an amount of insufficiency of the actual deceleration with respect to the desired deceleration rate.

In the event that the actual rate of deceleration by activation of the first brakes 20, 22 is higher than the desired rate of deceleration due to rust on the disc rotors 10 and/or 11, for example, the computer 68 commands the solenoid-operated control valves 30, 32 of the first brake system so that the deceleration rate obtained by the first brakes 20, 22 is reduced to the desired deceleration rate.

Further, the computer 68 calculates actual brake forces applied to the front and rear wheels, based on the output signals of the front-wheel and rear-wheel brake-force sensors 80, 82. The brake forces produced by the front front-wheel brakes 20 and the first rear-wheel brakes 22 are determined according to the selected brake-force distribution control pattern of FIG. 4. However, it is inevitable that the actual distribution between the front and rear brake forces more or less deviates from the desired or ideal distribution represented by the control pattern. In view of this tendency, the computer 68 calculates the fluid pressures to be applied to the second front-wheel brakes 21 and the second rear-wheel brakes 23, based on the obtained amount of insufficiency of the actual deceleration and the amount of deviation of the brake force distribution between the front and rear wheels. Based on the calculated fluid pressures, the computer 68 determines the amounts of electric current to be applied to the solenoids 64, 66 and to the solenoids 65, 67. With the determined electric currents applied to these solenoids, the second brakes 21, 23 are operated in order to increase the brake forces for the front and rear wheels.

In the next control cycle, the actual vehicle deceleration rate, and the actual brake forces for the wheels, are again detected by the vehicle deceleration sensor 74, and the front-wheel and rear-wheel brake-force sensors 80, 82, and the above-indicated control cycle is repeated so as to control the actual deceleration rate of the vehicle, substantially in accordance with the desired deceleration rate, while maintaining the distribution rate of the front and rear brake forces at an optimum value that suits the current load condition of the vehicle. Of course, the supply of the electric current to the solenoids 65, 67 is cut off to reduce the fluid pressures in the brake cylinders 17, 19, if the brake forces produced by the second brakes 21, 23 have exceeded the desired values. In this case, the supply of the electric current to the solenoids 64, 66 may also be cut off if desired.

Figure 5:
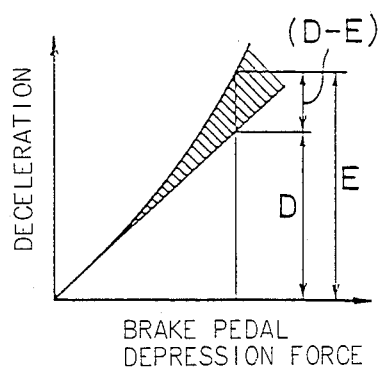
FIG. 5 is an explanatory graphical representation illustrating braking effects (deceleration rates of the vehicle) produced by a first and a second brake of the braking system.

It will be understood from the foregoing description that the second brakes 21, 23 are operated to produce a braking effect (an amount of deceleration) equal to a difference $(D-E)$ between a deceleration rate D obtained by the first brakes 20, 22, and the desired deceleration rate E, as shown in FIG. 5. Therefore, the solenoid-operated control valves 58–61 of the second brakes 21, 23, and the second-brake controller 70 for the control valves, can serve their function if these members are capable of compensating for a relatively small portion of the desired deceleration amount indicated by hatched area in FIG. 5. The above control of the second brakes 21, 23 is referred to as "second-brake control function".

The computer 68 repeats calculating a difference (indicative of a slip ratio) between the actual rotating speed of each of the front and rear wheels and the estimated vehicle running speed, based on the speed signals from the speed sensors 90, 92, even while the computer 68 is performing the above-described second-brake control function. If the calculated difference exceeds a predetermined value $\Delta V$ as indicated in FIG. 6, the computer 68 interrupts the second-brake control function, and commences an anti-skid control function. Described in more detail, the computer 68 produces pressure decreasing commands to reduce the fluid pressures in the brake cylinders 17 and/or 19 of the second brakes 21, 23, by means of the solenoid-operated control valves 58, 59 and/or 60, 61, for reducing the brake forces of the second brakes 21 and/or 23. The computer 68 produces pressure increasing commands, when the difference between the rotating speeds of the front and/or rear wheels and the estimated running speed of the vehicle has been reduced below the predetermined value $\Delta V$, as a result of the decrease in the fluid pressures in the brake cylinders 17 and/or 19. Consequently, the fluid pressures in these brake cylinders 17 and/or 19 are increased. This pressure decreasing and increasing control of the second brakes 21 and/or 23 is repeated so as to maintain the slip ratios of the front and/or rear wheels within the predetermined optimum range which permits satisfactory running stability and braking efficiency of the vehicle.

In the case where the friction coefficient of the road surface is comparatively low, there is a possibility that the mere reduction of the brake forces of the second front-wheel brakes 21 and/or second rear-wheel brakes 23 does not permit the slip ratios of the wheels to be lowered to a value within the optimum range. Further, if the friction coefficient of the road surface is considerably low, the slip ratios of the front and/or rear wheels may become excessively high, before the second brakes 21, 23 are activated. In such events, the computer 68 first operates the solenoid-operated control valves 30, 32 of the first brakes 30 and/or 32, in order to reduce the slip ratios of the front and/or rear wheels to a level slightly lower than the lower limit of the optimum range. Then, the computer 68 commands the control valves 58, 59 and/or 60, 61 to control the fluid pressures in the brake cylinders 17 and/or 19 of the second brakes 21 and/or 23, so as to maintain the slip ratios of the corresponding wheels within the optimum range. This is the manner in which the anti-skid control of the braking system is effected in the present illustrated embodiment.

In any case, the anti-skid control of the braking system is accomplished mainly by controlling or changing the fluid pressures in the brake cylinders 17, 19 of the second brakes 21, 23. These changes in the fluid pressures in the brake cylinders 17, 19 will not be transmitted to the master cylinder 24, in the illustrated embodiment, unlike a conventional anti-skid braking system which tends to suffer from deterioration of sealing members of the master cylinder, or undesirable shocks imparted to the brake pedal, due to considerable pressure changes in the master cylinder. In the illustrated embodiment, the solenoid-operated control valves 58, 59, 60 and 61 are adapted to be capable of controlling the fluid flow by means of changing the electric current applied. This control of the electric current to regulate the fluid flow through the control valves assures improved control of the fluid pressures in the brake cylinders, and reduced vibrations transmitted to the vehicle body, as compared with an on-off control of the solenoids to regulate the fluid flow by controlling the duty cycle of the solenoids.

The above description refers to the operation while the first and second brake systems are both in the normal condition. If one of the first and second brake system fails, a brake can be applied to the vehicle by the normal one of the two systems, since the two brake systems are independent of each other. Thus, the present anti-skid braking system assures safety of the vehicle upon failure of either one of the first and second brake systems.

While the illustrated embodiment is adapted such that the solenoid-operated control valves 30, 32 are activated only where the brake forces produced by the first brakes 20, 22 are excessively large, it is possible to activate the control valves 30, 32, if it is desired to rapidly reduce the braking effect on the disc rotors 10, 11, even if the brake forces of the first brakes 20, 22 are not exceesive.

In the illustrated embodiment, the fluid pressures in the second brakes 21 for the left-front and right front wheels are changed simultaneously. Similarly, the fluid pressures in the second brakes 23 for the left-rear and right-rear wheels are also changed simultaneously. However, the fluid pressures in the second brakes 21 for the front wheels, or in the second brakes 23 for the rear wheels, may be changed independently of each other. Further, the fluid pressures in all of the four second brakes 21, 23 may be changed independently of each other. In this latter case, it is desirable to provide each of the wheels with a load sensor and a brake force sensor.

In the illustrated embodiment, the second brakes 21, 23 are controlled according to the predetermined control patterns, i.e., so as to satisfy a relation between the brake pedal operating force and the desired rate of vehicle deceleration, a relation between the desired deceleration rate and time, and a relation between the brake forces of the front wheels and those of the rear wheels, as previously discussed. However, the principle of the present invention may be practiced without any or all of these second-brake control functions which are effected for the purposes other than maintaining the slip ratios of the wheels within the predetermined range. The simplest form of the anti-skid braking system according to the present invention is provided when all of such second-brake control functions are eliminated. In this simplest form, the anti-skid control operation of the braking system is generally commenced by first reducing the fluid pressures in the first brake system. On the contrary, it is possible to modify the controller 70 so that other second-brake control functions may be additionally achieved, or substituted for the second-brake control functions performed in the illustrated embodiment. For example, it is possible to activate the second brakes 21, 23 during a temporary stop of the vehicle on a slope, in order to prevent the vehicle from rolling down the slope, or during a temporary stop of the vehicle equipped with an automatic transmission, in order to avoid the vehicle from starting. Further, the braking system may be provided with a traction controller for activating the second brakes when the slip ratios of the drive wheels exceed a predetermined limit when the vehicle is started, or when a difference between the slip ratios of the left and right wheels exceeds a limit, due to a difference of the friction coefficient of the road surfaces.

While the two calipers 12, 13 or 14, 15 are used for the first and second brakes 20, 21 or 22, 23, respectively, the two brake cylinders for the first and second brakes may be mounted on a single caliper. Although the second brakes 21, 23 are hydraulically operated, the second brakes may consist of other types of brakes such as electromagnetic brakes and regenerative brakes.

The present anti-skid braking system may employ various control devices or methods known in the art, for preventing skidding of the wheels of a vehicle, provided that these devices and methods are not incompatible with the principle of the present invention discussed above.

While the present invention has been discribed in its preferred embodiment with a certain degree of particularity, it is to be understood that the invention is not limited thereto, but may be embodied with various changes, modifications and improvements other than indicated above, which may occur to those skilled in the art, without departing from the spirit and scope of the invention defined in the following claims.

What is claimed is:

1. An anti-skid braking system for an automotive vehicle, comprising:

a first brake system including (a) an operator-controlled brake operating member, (b) a master cylinder responsive to an operation of said brake operating member for generating a fluid pressure which corresponds to an operation value of said brake operating member, (c) a first brake provided for a wheel of the vehicle, and having a brake cylinder which is actuated by the fluid pressure generated by said master cylinder, and (d) first solenoid-operated control valve means disposed in a fluid passage between said master cylinder and said brake cylinder, and operable between a first position for communication of said brake cylinder with said master cylinder, and a second position for communication of said brake cylinder with a reservoir;

a second brake system including a second brake which cooperates with said first brake to apply a brake to said wheel of the vehicle;

a speed sensor for generating a speed signal indicative of a rotating speed of said wheel; and an anti-skid controller connected to said first and second brake systems and said speed sensor, and including means for estimating a slip ratio of said wheel of the vehicle based on said speed signal generated by said speed sensor, means for determining whether the estimated slip ratio exceeds a predetermined upper limit, and means for controlling said first determined upper limit, and means for controlling said first solenoid-operated control valve means, if said estimated slip ratio of said wheel has exceeded said upper limit, so as to lower the fluid pressure in said brake cylinder of said first brake to a level lower than a point at which the slip ratio is in a predetermined optimum range, said anti-skid controller further including means for subsequently controlling a brake force of said second brake, so as to maintain said slip ratio within said optimum range, said means for controlling said first solenoid-operated control valve means being inoperative to control the pressure in said brake cylinder of said first brake for the purpose of maintaining said slip ratio within said optimum range, while the brake force of said second brake is controlled so as to maintain said slip ratio within said optimum range.

2. An anti-skid braking system according to claim 1, wherein said anti-skid controller is operable selectively in a first mode in which said first solenoid-operated control valve means is controlled to lower the fluid pressure in said brake cylinder of said first brake to said level before said brake force of said second brake is controlled, and in a second mode in which only the brake force of said second brake is controlled, without controlling said first solenoid operated control valve means to lower the fluid pressure in said brake cylinder of said first brake, said second mode being selected if the fluid pressure in said brake cylinder of said first brake is low enough to permit said total brake force to be adjusted to maintain said slip ratio within said optimum range by controlling only the brake force of said second brake.

3. An anti-skid braking system according to claim 1, wherein said anti-skid controller is operable to place said first solenoid-operated control valve means in said second position for communication of said brake cylinder with said reservoir, if said controller determines that a decrease in the brake force of said second brake is not sufficient to maintain said slip ratio within said optimum range, even after the control of the brake force of said second brake is commenced so as to maintain said slip ratio within said optimum range.

4. An anti-skid braking system according to claim 1, wherein said first brake and said second brake are provided for each of a left-front and a right-front wheel, and a left-rear and a right-rear wheel of the vehicle.

5. An anti-skid braking system according to claim 4, wherein said second brake is hydraulically operated, and said second brake system includes:
a hydraulic pressure source operated by a power unit to generate a fluid pressure;
a reservoir for storing a working fluid; and
second solenoid-operated control valve means controlled by said anti-skid controller, between a first position for communication of a brake cylinder of said second brake with said hydraulic pressure source, and a second position for communication of said brake cylinder of said second brake with said reservoir.

6. A anti-skid braking system according to claim 5, wherein said second solenoid-operated control valve means includes front-wheel solenoid-operated control valve means connected to a pair of second front-wheel brakes provided for said left-front and right-front wheels, and rear-wheel solenoid-operated control valve means connected to a pair of second rear-wheel brakes provided for said left-rear and right-rear wheels, said speed sensor being provided for each of said left-front and right-front wheels, and left-rear and right-rear wheels, said anti-skid controller controlling said front-wheel solenoid-operated control valve means based on one of two front-wheel speed signals of the speed sensors for said left-front and left-front wheels, which indicates a higher rotating speed than the other front-wheel speed signal, said anti-skid controller controlling said rear-wheel solenoid-operated control valve means based on one of two rear-wheel speed signals of the speed sensors for said left-rear and right-rear wheels, which indicates a lower rotating speed than the other rear-wheel speed signal.

7. An anti-skid braking system according to claim 5, wherein said second solenoid-operated control valve means is operable to control rates of flow of the fluid into and from said brake cylinder of said second brake.

8. An anti-skid braking system according to claim 1, further comprising a second-brake controller connected to said second brake system, for automatically activating said second brake, for a purpose other than maintaining said slip ratio within said optimum range.

9. An anti-skid braking system according to claim 8, wherein said second-brake controller is operable while said anti-skid controller is not operating, and becomes inoperable to attain said purpose when said anti-skid controller starts to operate for lowering the fluid pressure in the brake cylinder of said first brake to said level.

10. An anti-skid braking system according to claim 8, further comprising a first detecting device for detecting said operation value of said brake operating member, and a second detecting device for detecting an actual braking effect applied to the vehicle, said first and second detecting devices being connected to said second-brake controller, and wherein
said first brake produces a braking effect which is smaller than a desired braking effect predetermined corresponding to the operation value of said brake operating member detected by said first detecting device, said second-brake controller comparing said actual braking effect detected by said second detecting device with said desired braking effect, and operating said second brake so that said second brake produces a braking effect equal to a difference between said actual and desired braking effects.

11. An anti-skid braking system according to claim 10, wherein said second-brake controller includes a computer which comprises a control pattern memory storing control pattern data representative of a relation between said operation value of said brake operating member and said desired braking effect.

12. An anti-skid braking system according to claim 11, wherein said control pattern memory stores a plurality of braking-effect control patterns representative of different relations between said operation value and said desired braking effect, said computer automatically selecting a predetermined one of said plurality of braking-effect control patterns, as an initially set pattern, upon application of power to said second-brake controller, said braking system further comprising an operator-controlled pattern selector means connected to said second-brake controller, said computer replacing the automatically selected one of said braking-effect control patterns by another selected by said pattern selector means.

13. An anti-skid braking system according to claim 11, wherein said first detecting device detects an operating force exerted to said brake operating member, and said second detecting device detects a rate of deceleration of the vehicle, said control pattern memory storing control pattern data representative of a relation between said operation force and said rate of deceleration.

14. An anti-skid braking system according to claim 13, wherein said operator-controlled braking operating member consists of a foot-operated brake pedal, and said first detecting device comprises a pressure sensor disposed on a pedal pad of said brake pedal, said second detecting device comprising a deceleration sensor operable for detecting said rate of deceleration of the vehicle.

15. An anti-skid braking system according to claim 8, wherein said first brake and said second brake are provided for each of a left-front and a right-front wheel, and a left-rear and a right-rear wheel of the vehicle, said second-brake controller including a control pattern memory storing at least one distribution control pattern representative of a desired relation between a sum of brake forces of said first and second brakes for said left-front and right-front wheels, and a sum of brake forces of said first and second brakes for said left-rear and right-rear wheels, said second brake for said left-front and right-front wheels being controlled according to said desired relation.

16. An anti-skid braking system according to claim 15, further comprising a front-wheel load sensor for sensing a load applied to said left-front and right-front wheels, a rear-wheel load sensor for sensing a load applied to said left-rear and right-rear wheels, a front-wheel brake-force sensor for sensing said front-wheel brake forces, and a rear-wheel brake-force sensor for sensing said rear-wheel brake forces.

17. An anti-skid braking system according to claim 8, wherein said second-brake controller includes a control pattern memory which stores a timing control pattern indicative of a relation between a time lapse from a start of brake application to the vehicle, and a desired braking effect, said second brake being controlled according to said relation between said time lapse and said desired braking effect.

18. An anti-skid braking system according to claim 10, wherein said first brake system further includes an emergency control circuit operable for normally placing said first solenoid-operated control valve means in said first position for communication of said first brake with said master cylinder, and for placing said first solenoid-operated control valve means in said second position for communication of said first brake with said reservoir, if an actual braking effect produced by said first brake exceeds said desired braking effect.

19. An anti-skid braking system according to claim 8, wherein said second-brake controller includes a traction controller operable for activating said second brake so as to maintain a slip ratio of a drive wheel of the vehicle within another predetermined optimum range, if said slip ratio has exceeded another predetermined upper limit, when said vehicle is started.

20. An anti-skid braking system according to claim 8, wherein said second-brake controller includes a controller operable for activating said second brake while said vehicle is temporarily stopped.

21. An anti-skid braking system for an automotive vehicle having a left-front and right-front wheel, and a left-rear and a right-rear wheel, comprising:

a first brake system including an operator-controlled brake operating member, a master cylinder responsive to an operation of said brake operating member for generating a fluid pressure which corresponds to an operation value of said brake operating member, a first brake provided for each of said left-front, right-front, left-rear and right-rear wheels of the vehicle, and having a brake cylinder which is actuated by the fluid pressure generated by said master cylinder, and first solenoid-operated control valve means disposed in a fluid passage between said master cylinder and said brake cylinder, and operable between a first position for communication of said brake cylinder with said master cylinder, and a second position for communication of said brake cylinder with a reservoir;

a second brake system including a hydraulic pressure source operated by a power unit to generate a fluid pressure, a reservoir for storing a working fluid, a second brake provided for each wheel, and cooperating with said first brake to apply a brake to each wheel, and second solenoid-operated control valve means controlled by said anti-skid controller, between a first position for communication of a brake cylinder of said second brake with said hydraulic pressure source, and a second position for communication of said brake cylinder of said second brake with said reservoir;

a speed sensor for generating a speed signal indicative of a rotating speed of said wheel; and an anti-skid controller connected to said first and second brake systems and said speed sensor, for estimating a slip ratio of said wheel of the vehicle based on said speed signal generated by said speed sensor, determining whether the estimated slip ratio exceeds a predetermined upper limit, and controlling said first solenoid-operated control valve means, if said estimated slip ratio of said wheel has exceeded said upper limit, so as to lower the fluid pressure in said brake cylinder of said first brake to a level lower than a point at which the slip ratio is in a predetermined optimum range, said anti-skid controller subsequently controlling a brake force of said second brake, for adjusting a total brake force of said first and second brakes, so as to maintain said slip ratio within said optimum range, said second solenoid-operated control valve means including front-wheel solenoid-operated control valve means connected to a pair of said second front-wheel brakes provided for said left-front and right-front wheels, and rear-wheel solenoid-operated control valve means connected to a pair of second rear-wheel brakes provided for said left-rear and right-rear wheels, said speed sensor being provided for each of said left-front and right-front wheels, and left-rear and right-rear wheels, said anti-skid controller controlling said front-wheel solenoid-operated control valve means based on one of two front-wheel signals of the speed sensors for said left-front and right-front wheels, which indicates a higher rotating speed than the other front-wheel speed signal, said anti-skid controller controlling said rear-wheel solenoid-operated control valve means based on one of two rear-wheel speed signals of the speed sensors for said left-rear and right-rear wheels, which indicates a lower rotating speed than the other rear-wheel speed signal.

* * * * *